(12) United States Patent
Podolak et al.

(10) Patent No.: US 8,775,012 B2
(45) Date of Patent: Jul. 8, 2014

(54) MOTOR VEHICLE IGNITION KEY, MOTOR VEHICLE NAVIGATION DEVICE, MOTOR VEHICLE SYSTEM, AND METHODS

(75) Inventors: Christian Podolak, Freiburg im Breisgau (DE); Hans Joachim Moersdorf, Fuerth (DE); Christian Arzt, Erlangen (DE); Martin Rulsch, Erlangen (DE); Sergey Ershov, Erlangen (DE); Robert Couronne, Erlangen (DE)

(73) Assignee: Fraunhofer-Gesellschaft zur Foerderung der angewandten Forschung e. V., Munich (DE)

( * ) Notice: Subject to any disclaimer, the term of this patent is extended or adjusted under 35 U.S.C. 154(b) by 633 days.

(21) Appl. No.: 12/909,164

(22) Filed: Oct. 21, 2010

(65) Prior Publication Data

US 2011/0098878 A1    Apr. 28, 2011

(30) Foreign Application Priority Data

Oct. 22, 2009 (EP) .................................... 09013367

(51) Int. Cl.
| | |
|---|---|
| *G05B 19/00* | (2006.01) |
| *B60G 1/00* | (2006.01) |
| *B60Q 1/26* | (2006.01) |
| *B60Q 1/32* | (2006.01) |
| *B60R 25/24* | (2013.01) |
| *B60R 25/20* | (2013.01) |

(52) U.S. Cl.
CPC .............. *B60Q 1/2669* (2013.01); *B60Q 1/323* (2013.01); *B60R 25/24* (2013.01); *B60R 25/2009* (2013.01)
USPC .......................... 701/31.4; 340/5.64; 340/5.72

(58) Field of Classification Search
CPC ...... B60Q 1/2669; B60Q 1/323; B60R 25/24; B60R 25/246; B60R 25/2009
USPC ................... 701/31.4, 36; 702/138, 141, 160; 345/156, 158, 537, 68; 340/61, 5.64, 340/5.72, 425.5, 426.15; 455/456.3, 456.1, 455/418
See application file for complete search history.

(56) References Cited

U.S. PATENT DOCUMENTS

| | | | |
|---|---|---|---|
| 6,160,478 | A | 12/2000 | Jacobsen et al. |
| 6,658,292 | B2 | 12/2003 | Kroll et al. |
| 7,373,820 | B1 | 5/2008 | James |
| 7,512,515 | B2 | 3/2009 | Vock et al. |
| 2004/0259591 | A1* | 12/2004 | Grams et al. ............... 455/556.1 |
| 2005/0210419 | A1* | 9/2005 | Kela et al. ...................... 715/863 |
| 2005/0212760 | A1* | 9/2005 | Marvit et al. ................. 345/156 |
| 2007/0176898 | A1* | 8/2007 | Suh ............................... 345/158 |
| 2007/0211573 | A1* | 9/2007 | Hermansson ................... 367/99 |
| 2010/0007463 | A1* | 1/2010 | Dingman et al. ............ 340/5.72 |

(Continued)

FOREIGN PATENT DOCUMENTS

| | | |
|---|---|---|
| CA | 2 539 115 A1 | 3/2005 |
| EP | 1 304 250 A2 | 4/2003 |

(Continued)

*Primary Examiner* — Marthe Marc-Coleman
(74) *Attorney, Agent, or Firm* — Keating & Bennett, LLP (57) ABSTRACT

What is described is a motor vehicle ignition key and a method including a movement sensor for detecting the movement of the motor vehicle ignition key, a motor vehicle navigation device, and a method including a calculator for calculating a driving route in dependence of movement data, and a motor vehicle system and a method including a motor vehicle ignition key and a motor vehicle controller.

10 Claims, 4 Drawing Sheets

(56) References Cited

U.S. PATENT DOCUMENTS

| | | | |
|---|---|---|---|
| 2010/0190513 A1* | 7/2010 | Andreasson | 455/456.3 |
| 2010/0304757 A1* | 12/2010 | Yoshioka | 455/456.1 |
| 2011/0004436 A1* | 1/2011 | Beute | 702/141 |
| 2011/0161085 A1* | 6/2011 | Boda et al. | 704/260 |
| 2011/0175807 A1* | 7/2011 | Grover | 345/157 |
| 2011/0264407 A1* | 10/2011 | Pasolini et al. | 702/160 |
| 2012/0162066 A1* | 6/2012 | Herz et al. | 345/156 |
| 2012/0289217 A1* | 11/2012 | Riemer et al. | 455/418 |

FOREIGN PATENT DOCUMENTS

| | | |
|---|---|---|
| EP | 1 583 040 A1 | 3/2004 |
| JP | 10-148539 A | 6/1998 |
| JP | 2007-292505 A | 11/2007 |
| WO | 01/82789 A2 | 11/2001 |
| WO | 2008/057024 A1 | 5/2008 |
| WO | 2009/006980 A2 | 1/2009 |
| WO | 2009/031899 A1 | 3/2009 |
| WO | 2010/064178 A1 | 6/2010 |

* cited by examiner

MOTOR VEHICLE IGNITION KEY, MOTOR VEHICLE NAVIGATION DEVICE, MOTOR VEHICLE SYSTEM, AND METHODS

CROSS-REFERENCE TO RELATED APPLICATIONS

This application claims priority from European Patent Application No. 09013367.9 which was filed on Oct. 22, 2009, and is incorporated herein in its entirety by reference.

The present invention relates to a motor vehicle ignition key, a motor vehicle navigation device, a motor vehicle system, and methods that may be used in connection with a motor vehicle.

BACKGROUND OF THE INVENTION

In today's world, mobility is an important factor. Therefore, most people have a motor vehicle of their own. Each motor vehicle typically has one or more motor vehicle ignition keys associated with the motor vehicle. There are different embodiments of motor vehicle ignition keys. While motor vehicle ignition keys used to consist, in former times, only of a key bit with a key body, some of them nowadays have complex electronic circuits. Immobilizers in modern motor vehicles constituted a first step toward integrating electronics into a motor vehicle ignition key. This involves adding only a small RFID transponder to the key, which at start-up of the motor vehicle performs, in combination with an RFID reading device within the motor vehicle, an authentication for starting up the motor vehicle. In addition to the immobilizer, most modern motor vehicle ignition keys have a remote-control function for opening the doors of the motor vehicle; while remote controls used to transmit their data to the motor vehicle via infrared in former times, this nowadays has been almost entirely replaced by UHF radio transmission. A motor vehicle ignition key having an RFID transponder built therein is given a serial number of its own. This enables the motor vehicle to identify the motor vehicle user and to adjust the motor vehicle to suit the motor vehicle user. For example, the sitting position and minor settings may be adapted to the respective motor vehicle user. In addition, vehicle-specific data, for example the serial number of the vehicle, but also data relevant to maintenance such as the mileage or error codes, for example, may be stored on the motor vehicle ignition keys. Said data may be read out by a specialist workshop and be read out as a basis for a quick diagnosis.

Another technical innovation in the automotive field are motor vehicle navigation devices. Motor vehicle navigation devices increasingly replace the reading of maps, which is awkward. Whereas itineraries had to be planned ahead with the help of maps in former times, nowadays it is sufficient to input a destination into a navigation device. Navigation devices are able to find an optimum route from a starting point to a selected destination while taking into account a variety of conditions. The navigation device may adapt the route in dependence on the user's desires. For example, the user has the choice between the shortest and the fastest route. Modern navigation devices additionally have extensive data bases wherein the addresses of important places are stored. These may be car parks, railway stations, airports, but also restaurants or places of interest. Navigation devices exist in a variety of embodiments and ranges of functions. Currently, there are navigation devices that are fixedly built into a motor vehicle, and navigation devices that are portable and may be retrofitted into any motor vehicle.

Today, cars are the preferential means of locomotion for most people—irrelevant of whether one undertakes a long holiday trip or drives to the bakery at the corner. Modern man does not move anymore, or at least not more than he absolutely has to. This behavior results in numerous "diseases of affluence": obesity, hypertension, diabetes, and (as a result) cardiovascular diseases, which are greatly favored by lack of exercise. Even though modern man longs for a healthy and well-trained body, realization of such good intentions fails mostly because of the laziness or indolence threshold to be overcome ("one's weaker self"). Due to the demographic change, life-long prevention is indispensable so as to maintain a high quality of life even at an advanced age. Therefore, more regular exercise would be useful for many people. In competitive sports, systems for monitoring the physical fitness of an athlete have been used for quite some time. There are pulse sensors, for example, but also movement sensors, which record the athlete's movement. Nowadays, said systems are also available to amateur athletes. For example, there are systems for pulse measurement that consist of a chest strap and a watch. However, said systems do not provide any information about the distance traveled. A simple system for logging the distance traveled are mechanical pedometers. They have the disadvantage, among other things, that they are imprecise and do not take into account the variations in the step length. Another possibility of logging movement data are movement sensors which record a user's movements with the help of a 3D acceleration sensor. Said sensors may be attached close to the body and detect any movements during sport. A disadvantage of all of these devices is that they are designed for passionate amateur or competitive athletes. Prior to the beginning of any sportive activity, said devices are first applied to the athlete's body and/or be activated. Everyday movements, such as walking to the car or climbing stairs at home or at the office, are typically not detected by this system, since users do not want to burden themselves with additional devices in everyday life. A further disadvantage is that particularly people who are not enthusiastic about sports hardly have any interest in such additional products, and that consequently, they do not have any information about their everyday movements. However, with these people, said everyday movements are often the only sportive activities performed.

U.S. Pat. No. 7,373,820 shows a basic principle and a general application for detecting human movement activity.

U.S. Pat. No. 6,160,478 and U.S. Pat. No. 6,658,292 show examples of activity monitoring devices for medical applications and/or for patient care as portable and implantable sensors.

U.S. Pat. No. 7,512,515 shows examples of detecting human movement activities in leisure-time applications and/or lifestyle scenarios.

SUMMARY

According to an embodiment, a motor vehicle ignition key may have: a movement sensor for detecting a movement of the motor vehicle ignition key; a memory for recording the movement data acquired from the detected movement; and an interface for outputting the movement data to an external unit.

According to another embodiment, a method may have the steps of: a) detecting the movement of a motor vehicle ignition key by a movement sensor within the motor vehicle ignition key; b) recording the movement data acquired from the detected movement into a memory of the motor vehicle ignition key; and c) outputting the movement data to an external unit.

According to another embodiment, a motor vehicle navigation device may have: an interface for receiving movement data of a motor vehicle user that is detected by an external sensor worn on the body; and a calculator for calculating a driving route while taking into account the movement data.

According to another embodiment, a method may have the steps of: a) receiving movement data, captured by an external sensor, of a motor vehicle user by means of an interface of a motor vehicle navigation device; b) calculating a driving route using a unit of the motor vehicle navigation device while taking into account the received movement data.

According to another embodiment, a motor vehicle system may have: a motor vehicle ignition key including a movement sensor for detecting a movement of the motor vehicle ignition key, the motor vehicle ignition key including a memory for recording the movement data acquired from the detected movement, and a first interface for outputting the movement data to a motor vehicle controller; and a motor vehicle controller associated with the motor vehicle ignition key, including a second interface for receiving the movement data and for performing motor vehicle control tasks.

According to another embodiment, a method may have the steps of: a) detecting the movement of a motor vehicle ignition key using a movement sensor within the motor vehicle ignition key; b) recording the movement data acquired from the movement; c) outputting the movement data from the motor vehicle ignition key, and reception of the movement data on the part of a motor vehicle controller; d) performing motor vehicle control tasks while taking into account the movement data.

Another embodiment may have a computer program for performing a method, which method may have the steps of: a) detecting the movement of a motor vehicle ignition key by a movement sensor within the motor vehicle ignition key; b) recording the movement data acquired from the detected movement into a memory of the motor vehicle ignition key; and c) outputting the movement data to an external unit, when the computer program is executed on a processor.

Another embodiment may have a computer program for performing a method, which method may have the steps of: a) receiving movement data, captured by an external sensor, of a motor vehicle user by means of an interface of a motor vehicle navigation device; b) calculating a driving route using a unit of the motor vehicle navigation device while taking into account the received movement data, when the computer program is executed on a processor.

Another embodiment may have a computer program for performing a method, which method may have the steps of: a) detecting the movement of a motor vehicle ignition key using a movement sensor within the motor vehicle ignition key; b) recording the movement data acquired from the movement; c) outputting the movement data from the motor vehicle ignition key, and reception of the movement data on the part of a motor vehicle controller; d) performing motor vehicle control tasks while taking into account the movement data, when the computer program is executed on a processor.

The core idea of the present invention is to improve recording users' everyday movements and to improve their reactions to excessive immobility, and to be able to reduce the inhibition threshold or the additional effort involved that keeps many people from detecting monitoring of their everyday activities, when a motor vehicle key has a movement sensor integrated therein which is configured to detect a movement of the motor vehicle key and to therefrom obtain movement data which may be recorded within a memory of the motor vehicle key and be output to an external device via an interface. Starting from the assumption that a user carries the motor vehicle key around in his/her everyday movements, low-cost and user-friendly logging of the user's everyday movements is made possible for large sections of the population.

An advantage of the present invention therefore is that due to the integration of a movement sensor into a motor vehicle key, the movements of the motor vehicle key and, thus, the movements of the user may be recorded without the user having to carry around an additional device. A further advantage is that the user does not need to attach the motor vehicle key to his/her body for logging his/her movement data, such as with pulse sensors, for example, but may wear it loosely on the body, for example in a trouser pocket.

A further aspect of the present invention is based on the finding that a user may be better motivated to perform sportive activities when a motor vehicle navigation device has an interface for receiving movement data of a motor vehicle user, said data being detected by a sensor worn on the body, said motor vehicle navigation device further comprising a means for calculating a driving route while taking into account the movement data. Taking into account the movement data in the calculation of the driving route enables improved support—which, in particular, involves little effort and is possibly unnoticeable for the motor vehicle user—to integrate sportive activities into one's daily routine, and enables improved motivation to perform sportive activities.

Thus, a further advantage of the present invention is the fact that on the basis of a driving route being calculated while taking into account the movement data of the motor vehicle user, the motor vehicle user is motivated to perform sportive activities that may be integrated into the user's everyday life.

A further aspect of the present invention is based on the finding that the everyday movements of a user may be better recorded and that the user may be better motivated to perform sportive activities when a motor vehicle system comprises a motor vehicle ignition key and a motor vehicle controller, the motor vehicle ignition key comprising a movement sensor for detecting a movement of the motor vehicle ignition key and for obtaining movement data from the movement detected, and a memory for recording the movement data obtained, and a first interface for outputting the movement data to the motor vehicle controller, and the motor vehicle controller being associated with the motor vehicle key and comprising a second interface for receiving the movement data and for performing motor vehicle control tasks. Starting from the assumption that a user carries around the motor vehicle ignition key in his/her everyday movements, improved logging of the everyday movements of the user is enabled, in addition, since the motor vehicle controller may perform control tasks, improved integration of sportive activities into the everyday movements of the user is enabled.

A further advantage of the present invention therefore consists in the fact that when a motor vehicle user' movements are recorded and are used by a motor vehicle controller to perform control tasks, the motor vehicle controller can support the motor vehicle user in integrating sportive activities in his/her everyday movements, and can provide the motor vehicle user with feedback about his/her sportive activities.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
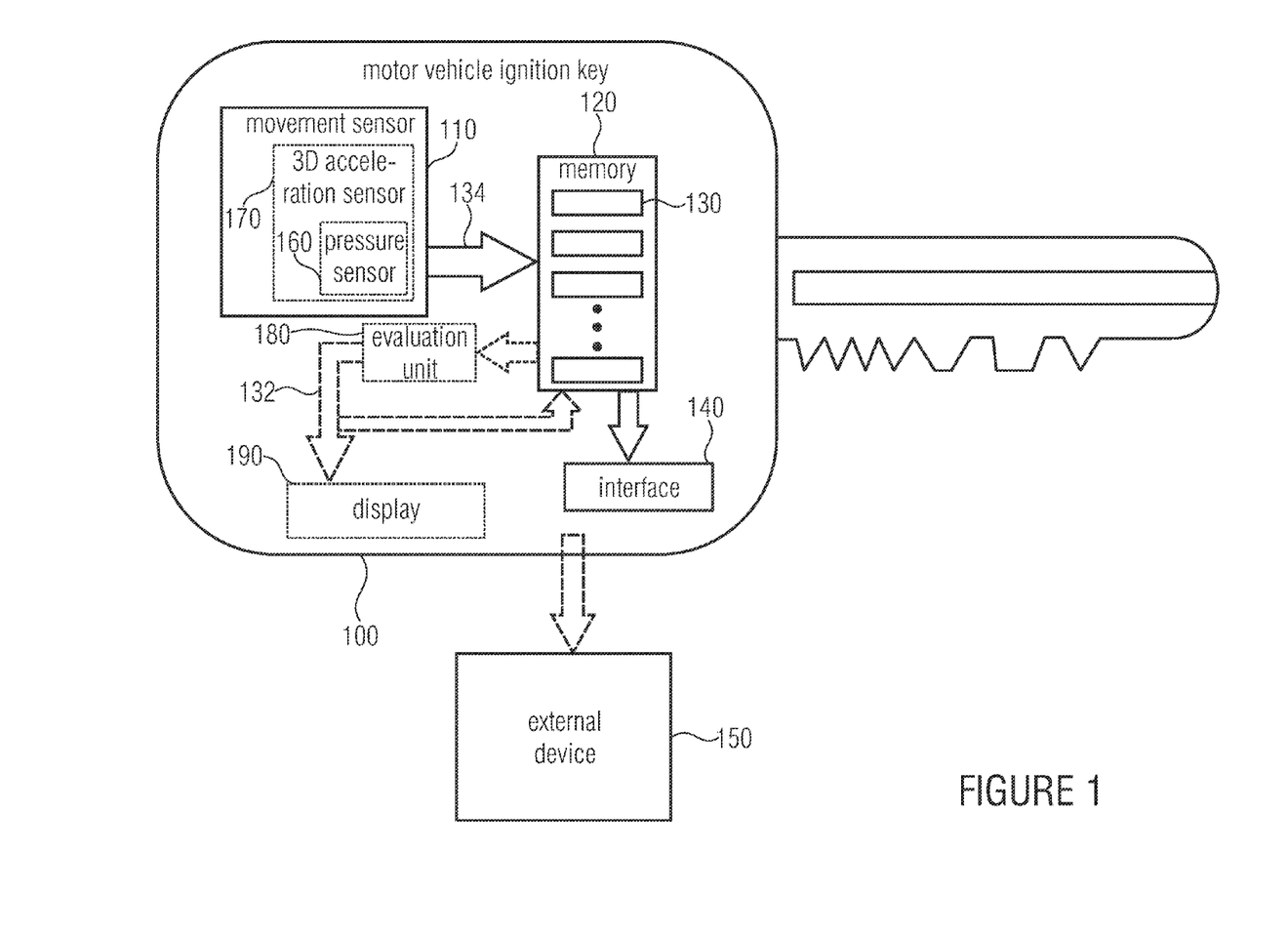
FIG. 1 shows a schematic representation of a motor vehicle ignition key in accordance with a first embodiment of the present invention.

FIG. 1 shows a schematic representation of a motor vehicle ignition key 100 in accordance with a first embodiment of the present invention. The motor vehicle ignition key 100 comprises a movement sensor 110, a memory 120, and an interface 140. In addition, FIG. 1 shows an external device 150. The movement sensor 110 is connected to the memory 120, and the memory 120 is connected to the interface 140. The memory 120 may contain movement data 130. The movement sensor 110 may be a miniaturized measurement system, for example, that is configured as a 3D acceleration sensor 170 comprising a pressure sensor 160. Said pressure gauge 160 may be integrated in the 3D acceleration sensor 170 or is configured as an additional component.

The movement sensor 110 continuously detects the movements of the motor vehicle ignition key 100, the 3D acceleration sensor 170 detecting movements of the motor vehicle ignition key in all 3 spatial directions, and the pressure sensor 160 providing, by means of the barometric formula, an estimate of the respective current altitude. From the detected movements, the movement sensor obtains the movement data 130, which is stored within the memory 120 of the motor vehicle ignition key 100. The stored movement data 130, for example acceleration data, and data concerning differences in altitude may be transmitted to the external device 150 via the interface 140. The detected 3D acceleration data and data concerning difference in altitude, i.e. raw data 134, may be evaluated by means of algorithms, for example, within the external device 150, so as to determine, on the one hand, the type of movement (sitting down, standing up, lying down, walking, jogging, running, cycling, and climbing stairs), and to determine, on the other hand, the intensity and duration of the movement as well as the difference in altitude covered.

Recording the movement data 130 or vital parameters presupposes that the motor vehicle ignition key 100 is as close to the body as possible, rather than being positioned in a carrier bag or in a loosely worn piece of clothing, since in this case, the measurement data will be corrupted. It is feasible that in a further embodiment, the motor vehicle ignition key 100 comprises an evaluation means 180 configured to obtain, from the raw data 134 provided by the movement sensor 110, classified activity information 132 as the movement data 130. Therefore, the motor vehicle ignition key 100 may be considered to be an intelligent system which processes the collected data or movement data 130, for example as a 3D acceleration and change in altitude, as raw data 134 of the acceleration sensor 110, and recognizes different types of movement, for example resting, i.e. sitting down, lying down, standing up, and the like, walking, running, climbing up and down stairs, cycling, etc. The system, or the ignition key 100, may further be able to establish the intensity of the respective movement.

It is not absolutely necessary to calculate the change in altitude from the barometric data and, thus, to have the pressure sensor 160 of the movement sensor 110, but this may be employed for improving the method performed in the evaluation means 180 for obtaining the classified activity information 134.

The movement data 130 may be present as raw data 134 provided by the movement sensor 110, for example as 3D acceleration and altitude data, or as classified activity information 132.

In other words, the raw data 134 provided by the movement sensor 110 is classified as activity information 132 by the evaluation means 180, the activity information 132 describing the types of activity and the intensities of the user's movements. The existence of an evaluation unit 180 within the motor vehicle ignition key 100 thus enables classifying the movements and/or the recorded raw data 134 as movement data 130 of a user of the motor vehicle ignition key 100, and information of the user about his/her activity data on the basis of the classified activity information 132. For displaying feedbacks, for example the activity level, to the user or wearer of the car key or motor vehicle ignition key 100, the motor vehicle ignition key 100 may further be provided with a display 190, for example an LED scale or the like. The user's activity calculated over a predetermined period of time may then be presented, e.g. directly on the motor vehicle ignition key 100 by means of an adequate display 190, for example LED scale, TFT display, OLED display, or the like. The motor vehicle ignition key 100 thus serves as a portable feedback system for monitoring, recording and feeding back a user's activity data.

In addition, this allows deactivating various functions of the motor vehicle ignition key 100 given specific movement patterns. For example, the ignition key function of starting up a motor vehicle may be deactivated when the evaluation means 180 of the motor vehicle ignition key 100 recognizes a movement pattern that resembles the movements of a drunk person. In addition, the motor vehicle ignition key 100 may comprise any functions such as immobilizer and remote control of a potential known motor vehicle ignition key.

The external device 150 may be, e.g., an ignition lock of a motor vehicle, or a PC for evaluating the movement data 130 externally to the motor vehicle.

Figure 2:
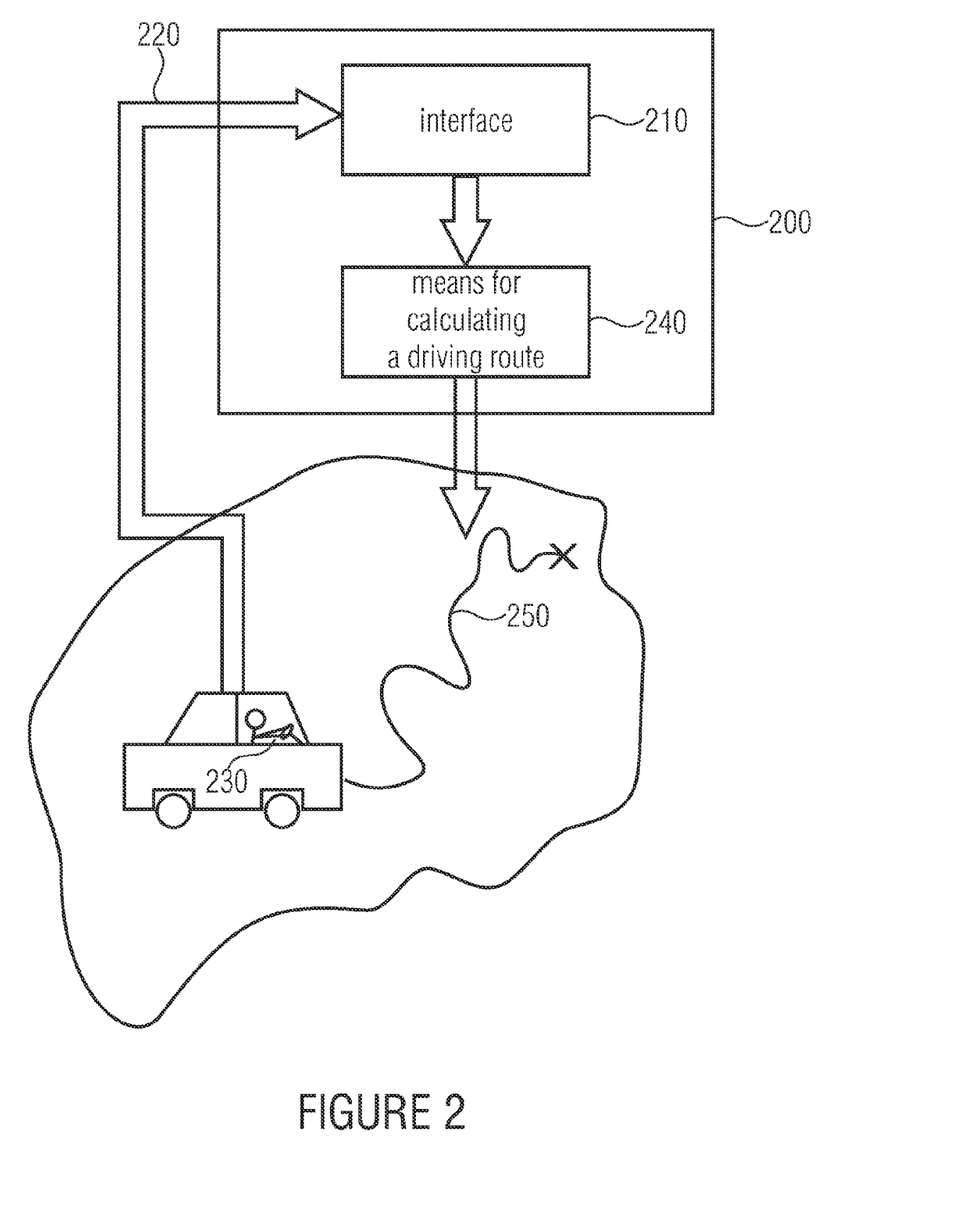
FIG. 2 shows a schematic representation of a motor vehicle navigation device in accordance with a second embodiment of the present invention.

FIG. 2 shows a schematic representation of a motor vehicle navigation device 200 in accordance with a second embodiment of the present invention. The motor vehicle navigation device 200 comprises an interface 210 for receiving movement data 220. In addition, the motor vehicle navigation device 200 comprises a means 240 for calculating a driving route 250. Moreover, FIG. 2 shows a motor vehicle user 230.

A motor vehicle user 230 has a sensor which detects and stores all of the movements of the motor vehicle user 230. The sensor may be a 3D acceleration sensor, for example, which is integrated into an everyday object of the motor vehicle user. Said movement data 220 is transmitted to the interface 210 of the motor vehicle navigation device 200. The means 240 of the motor vehicle navigation device 200 may then calculate a driving route 250 while taking into account the movement data 220, said calculated driving route 250 serving to support the motor vehicle user in integrating his/her sportive activities into his/her daily life. For example, a movement profile is created from the movement data 220 obtained, which movement profile provides the motor vehicle user 230 with detailed feedback about his/her state of movement.

On the basis of the calculated movement profile, the motor vehicle navigation device 200 calculates, e.g., suggestions for parking the vehicle within a larger radius from the destination. Said calculation is influenced by information about the local particularities, so that, e.g., advantageously parks, pedestrian zones etc. are suggested for the last few meters.

In addition, the motor vehicle navigation device may have, e.g., a data base comprising addresses of important locations. For example, the motor vehicle navigation device 200 may suggest to the motor vehicle user 230 sportive activities offered in the area, depending on the movement data 220 and/or on the movement profile.

In addition, the motor vehicle navigation device 200 may suggest to the motor vehicle user 230 a walk as an alternative to a driving route 250, depending on the movement data 220 and/or on the movement profile.

Moreover, the calculated movement profile may be called up by the motor vehicle user 230, e.g. via an interactive application built into the motor vehicle navigation device 200 or a comparable multi-media system of the car, so as to motivate the motor vehicle user 230 to become more active and to gradually adopt a healthy lifestyle.

Furthermore, the motor vehicle navigation device 200 may detect, e.g., a user profile comprising current (currently achieved) activity values, and allow the motor vehicle user 230 to define his/her physical activity in the form of target values (goals).

Transmission of the data between the sensor worn on the body and the motor vehicle navigation device 200 may be wireless, for example. The sensor worn on the body may be configured as a motor vehicle ignition key 100 in accordance with the first embodiment of the present invention, but may also be configured as any other sensor for recording movement data 220 that is designed to transmit the movement data 220 to the interface 210 of the motor vehicle navigation device 200.

Figure 3:
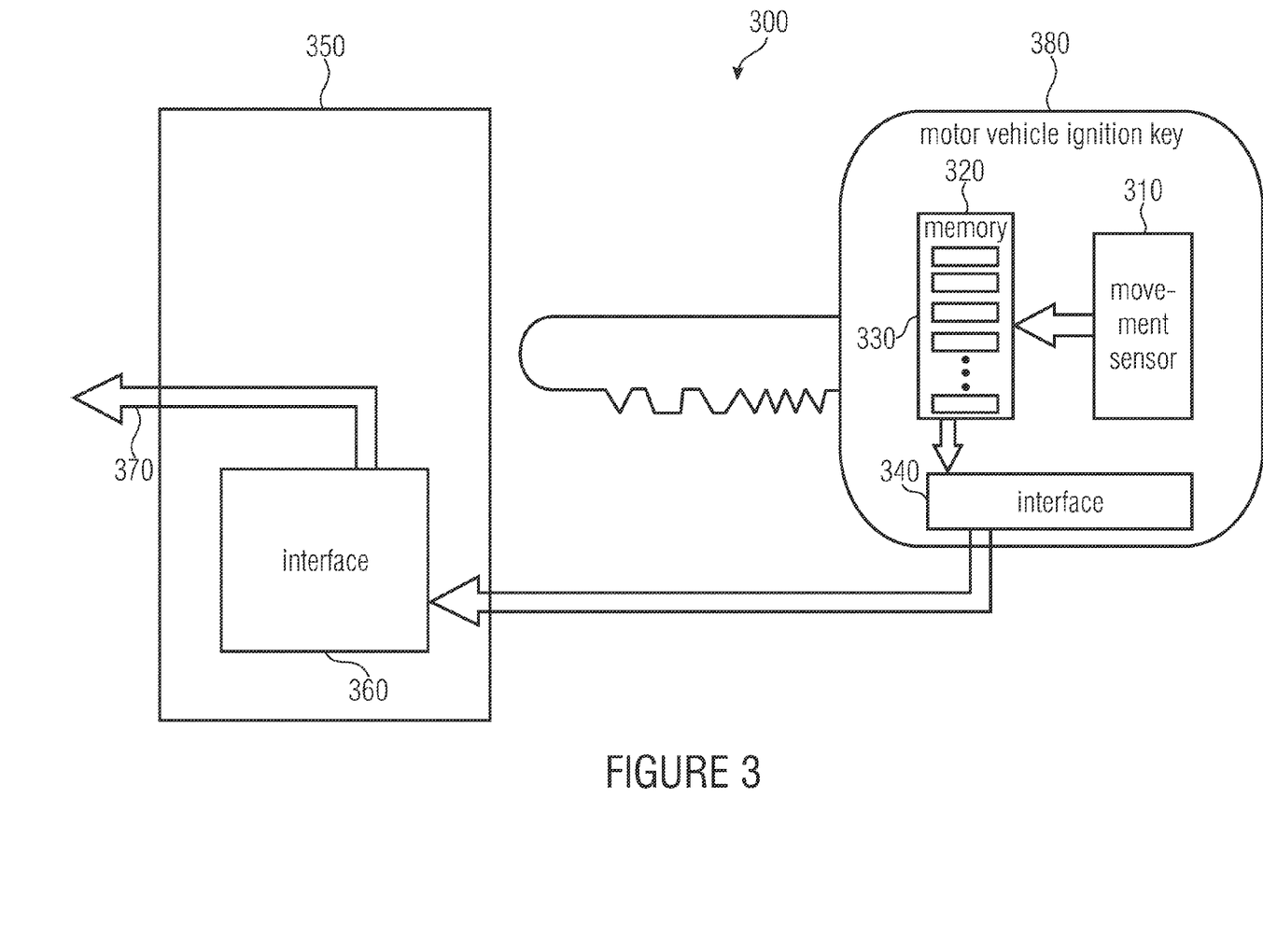
FIG. 3 shows a schematic representation of a motor vehicle system in accordance with a third embodiment of the present invention.

FIG. 3 shows a schematic representation of a motor vehicle system 300 in accordance with a third embodiment of the present invention. The motor vehicle system 300 comprises a motor vehicle ignition key 380 and a motor vehicle controller 350. The motor vehicle ignition key 380 comprises a movement sensor 310 and a memory 320, and an interface 340 for transmitting movement data 330. The motor vehicle controller 350 comprises a second interface 360 for receiving movement data 330 and for performing motor vehicle control tasks 370.

The movement sensor 310 of the motor vehicle ignition key 380 detects the movements of the motor vehicle ignition key 380, said detected movements being used to obtain movement data 330 stored within the memory 320. The movement data 330 thus also represents, e.g., the movements of a motor vehicle user of the motor vehicle ignition key 380. The movement data 330 may be transmitted to the second interface 360 of the motor vehicle controller 350 via the first interface 340 of the motor vehicle ignition key 380. The second interface 360 of the motor vehicle controller 350 may then perform motor vehicle control tasks 370 in dependence on the movement data 330. The motor vehicle controller 350 is associated with the motor vehicle ignition key 380.

For example, the motor vehicle ignition key 380 may be a motor vehicle ignition key 100 as is described in the first embodiment of the present invention. The movement sensor 310 of the motor vehicle ignition key 380 may be configured as a 3D acceleration sensor, for example, or may be configured as a 3D acceleration sensor comprising an altitude pressure sensor.

The motor vehicle controller 350 may be, e.g., a motor vehicle navigation device 200 as is described in the second embodiment of the present invention. In addition, the motor vehicle controller 350 may be directly connected, e.g., to a motor vehicle control system of a motor vehicle and comprise a receptacle for the motor vehicle key 380, for example an ignition lock. The motor vehicle controller may then deactivate, e.g. depending on the movement data 330 received, an intensity of the power steering function of the motor vehicle and/or a start-up function of the motor vehicle, it being possible, for example, to set the resistance of the steering of the motor vehicle to be stronger if the motor vehicle user has a lack of exercise. The start-up function of the motor vehicle may be deactivated, for example, when the movement data 330 of the motor vehicle user indicates that the motor vehicle user has consumed alcohol.

In addition, the motor vehicle system 300 may comprise a charging device, and the motor vehicle ignition key 380 may comprise a rechargeable energy store, the charging device being configured to charge the rechargeable energy store of the motor vehicle ignition key 380, and the charging device comprising, e.g., a first RFID radio transmission circuit so as to wirelessly charge the energy store of the motor vehicle ignition key 380. It is also possible to use both RFID radio transmission circuits for transmitting the movement data between the motor vehicle ignition key 380 and the motor vehicle controller 350. Moreover, the charging device as well as the motor vehicle ignition key 380 may comprise contacts which enable the energy store of the motor vehicle ignition key to be charged via the contacts.

It also feasible for a motor vehicle system 300 to comprise, e.g., a plurality of motor vehicle ignition keys 380, each of the motor vehicle ignition keys 380 having an index unambiguously associated with it. The motor vehicle controller 350 may then perform, e.g., control tasks 370 while taking into account the movement data 330 and the index of the motor vehicle ignition key 380. A motor vehicle which is shared, e.g., by a couple, each partner possessing their own motor vehicle ignition key 380, and which is equipped with a motor vehicle system 300 in accordance with the present invention, may then vary its driving characteristics, depending on the respective user. For example, the first partner may deactivate the variation in power steering, for example, whereas the second partner has activated the variation in power steering.

Moreover, transmission of the movement data 330 from the motor vehicle ignition key 380 to the motor vehicle controller 350 may be effected wirelessly (for example by means of inductive coupling) or via contacts arranged within the ignition lock of the motor vehicle and on the motor vehicle ignition key 380.

Figure 4:
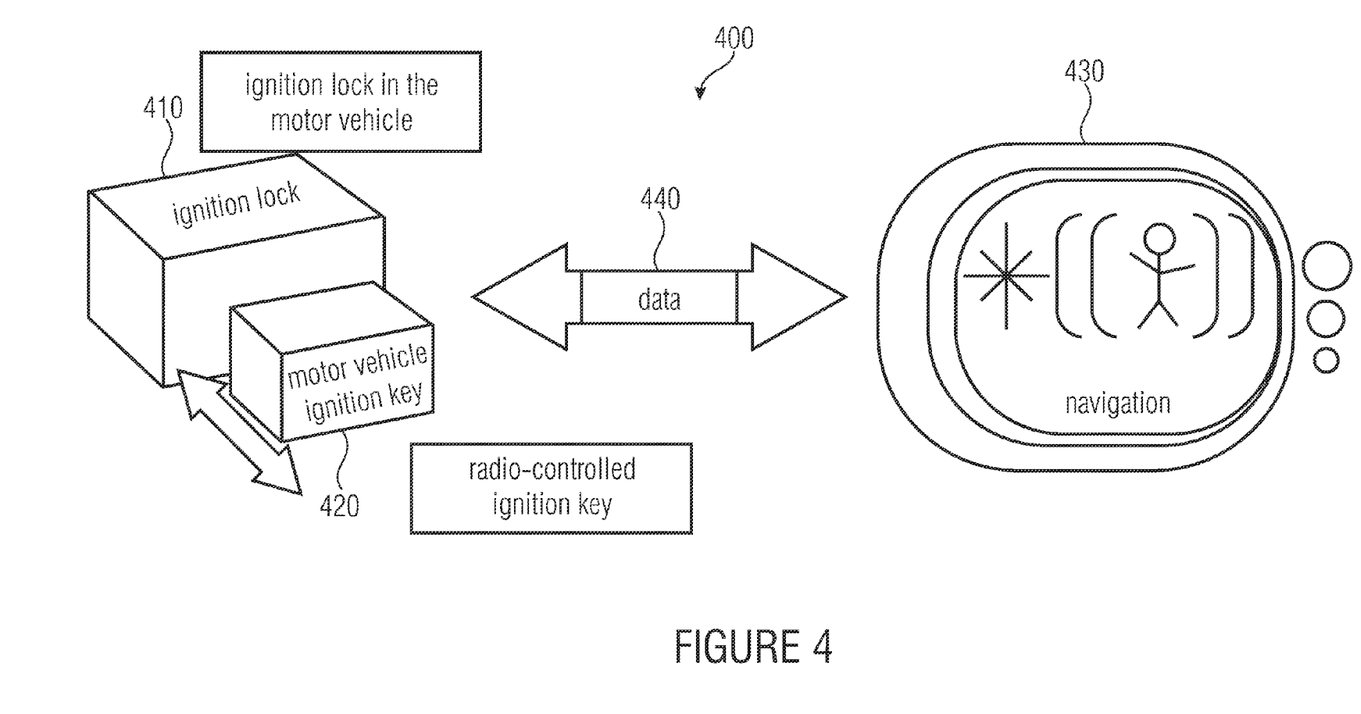
FIG. 4 shows a schematic representation of a motor vehicle system in accordance with a fourth embodiment of the present invention.

FIG. 4 shows a schematic representation of a motor vehicle system 400 in accordance with a fourth embodiment of the present invention. The motor vehicle system 400 comprises a motor vehicle ignition key 420 designed as a radio-controlled ignition key. Also, the motor vehicle system 400 comprises a motor vehicle controller having an ignition lock 410 as well as a motor vehicle navigation device 430.

The motor vehicle ignition key 420 may be configured, e.g., as a motor vehicle ignition key 100 as was described in the first embodiment of the present invention. The motor vehicle navigation device 430 may be configured, e.g., as a motor vehicle navigation device 200 as was described in the second embodiment of the present invention.

The motor vehicle ignition key 420 detects its movements and stores the movement data 440 obtained from the movements within a memory. The movement data 440 may be transmitted to a second interface within the motor vehicle navigation device 430 via a first interface within the motor vehicle ignition key 420. The motor vehicle navigation device 430 may then calculate a driving route in dependence on the movement data 440 received.

Communication between the motor vehicle ignition key 420, or radio-controlled ignition key 420, or "movement sensor car key", and the motor vehicle may be effected via RFID, Bluetooth, other radio-controlled technologies within the ISM band or, in a wired manner, via additional contacts within the ignition lock 410. Similarly, the radio-controlled ignition key 420 may be charged via the ignition lock.

A potential extension of the motor vehicle system 400 consists in a charging tray or charging device or ignition key readout unit or ignition readout device having a point of communication for home application, so that the data may be evaluated not only within the motor vehicle, but also on an external system or unit, for example on the home PC or any other PC, on a PDA, on a laptop, on a television set, or the like. The individual components of the motor vehicle system 400 may be configured to detect, to store, to evaluate, to transmit, and to display the traveled route by means of the user's activity data, within and outside the car or motor vehicle. In this context, the motor vehicle ignition key 420 may serve as storage medium.

As was already mentioned in the above paragraph, the motor vehicle ignition key 420 may be used as a storage medium in order to be able to store the personalized activity and movement profile data as well as the routes traveled (within the motor vehicle and/or on foot), and to transmit said data from the motor vehicle to a home application. For example, the movement data 440 may create, along with map material and/or the motor vehicle navigation device 430, a basis for interactive fitness coaching or a fitness application. In other words, e.g., the activity data and the route are stored on the motor vehicle ignition key 420. With the aid of the ignition key readout unit, said data may be read out, processed and presented on the external unit. In this manner, the user may be shown a comprehensive picture of the activity performed by him/her. Thus, the motor vehicle system 400 represents a portable feedback system as an activity coach which has the ability to record activity profiles, activity diaries, and the like.

Moreover, it is possible to use the motor vehicle ignition key 420 as a general storage medium not only for routes traveled, such as driving routes, distances covered on foot, and the like, as well as activity data, but also for planning routes. Accordingly, route planning may be performed, e.g., via an external unit, for example PC, PDA, laptop, or the like, and be stored on the motor vehicle ignition key 420. The data stored on the motor vehicle ignition key 420 may be automatically transmitted to the second interface within the motor vehicle navigation device 430 via the first interface within the motor vehicle ignition key 420. Setting of the route, important places (so-called points of interest), fitness trails and the like within the motor vehicle navigation device 430 is performed automatically; manually inputting the destination, or the intermediate destinations, via the motor vehicle navigation device 430 is omitted.

The core component of the motor vehicle system 400 described there is an intelligent movement sensor integrated into the radio-controlled ignition key 420, and its interconnection with the navigation device 430 of the motor vehicle.

This system may be referred to as ActiCoach: portable feedback system of daily activities on the basis of a motor vehicle ignition key for motivating the driver to move, or as a method and device for monitoring and interactively representing the driver's movement activities, or as a device for detecting, storing, transmitting, analyzing, and comparing movement activities for the purpose of providing fitness coaching to the driver.

In summary, it may be stated that as cars, or motor vehicles, have long since evolved into lifestyle products, it seems useful to integrate them into personal fitness programs and preventive health care. In this context, cars detect the sportive activities of their users, and in the case of a lack of exercise, they encourage their users to compensate for this lack of exercise by integrating movements into their daily routines.

Because of their significance for the operation of motor vehicles, and because of the resulting necessity to carry them with one, keys of motor vehicles represent an ideal platform for integrating intelligent sensor systems. This is particularly true for a system for detecting physical activities, i.e. movement, since it needs to be continually worn on the body. In addition, motor vehicle ignition keys offer the possibility of intuitively, as it were, transmitting the established movement data to the motor vehicle via the ignition lock. On the one hand, this concept has many advantages in terms of usability and driver acceptance, since it is no longer necessary to wear a separate measuring device or sensor unit, and since one carries around the motor vehicle ignition key almost all the time, and on the other hand, it offers varied possibilities of system extension and data exchange via contacts arranged within the ignition lock, or by using radio communication technologies.

Embodiments of the methods may be complemented with any aspects and functionalities of the inventive devices.

Even though some aspects were described in connection with a device, it is understood that said aspects also represent a description of the corresponding method, so that a block or a component of a device is also to be understood as a corresponding method step or as a feature of a method step. By analogy therewith, aspects that were described in connection with, or as, a method step also represent a description of a corresponding block or detail or feature of a corresponding device.

Depending on specific implementation requirements, embodiments of the invention may be implemented in hardware or in software. Implementation may be effected by using a digital storage medium, for example a floppy disk, a DVD, a Blu-ray Disc, a CD, a ROM, a PROM, an EPROM, an EEPROM, or a flash memory, a hard disk, or any other magnetic or optical memory which has electronically readable control signals stored thereon that can cooperate, or actually do cooperate, with a programmable computer system such that the respective method is performed. Therefore, the digital storage medium may be computer-readable. Some embodiments in accordance with the invention thus comprise a data carrier which has electronically readable control signals that are capable of cooperating with a programmable computer system such that any of the methods described herein is performed.

Generally, embodiments of the present invention may be implemented as a computer program product having a program code, the program code being operative to perform any of the methods, when the computer program product runs on a computer. The program code may also be stored on a machine-readable carrier, for example.

Other embodiments comprise the computer program for performing any of the methods described herein, said computer program being stored on a machine-readable carrier.

In other words, an embodiment of the inventive method thus is a computer program which has a program code for performing any of the methods described herein, when the computer program runs on a computer. A further embodiment of the inventive methods thus is a data carrier (or a digital storage medium or a computer-readable medium) which has the computer program for performing any of the methods described herein recorded thereon.

A further embodiment of the inventive method thus is a data stream or a sequence of signals which represent(s) the computer program for performing any of the methods described herein. The data stream or the sequence of signals may be configured, for example, to be transferred via a data communication link, for example via the internet.

A further embodiment comprises a processing means, for example a computer or a programmable logic device, which is configured or adapted to perform any of the methods described herein.

A further embodiment comprises a computer on which the computer program for performing any of the methods described herein is installed.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, in some embodiments, the methods are performed by any hardware device. This may be a universally usable hardware such as a computer processor (CPU), or a hardware specific to the method, such as an ASIC, for example.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A motor vehicle system comprising:
a movement sensor arranged to be worn or carried by a motor vehicle user and configured to detect a movement of the motor vehicle user, the movement sensor comprising a memory configured to record the movement data acquired from the detected movement and a first interface configured to output the movement data to a motor vehicle controller; and
a motor vehicle controller comprising a second interface configured to receive the movement data and to perform motor vehicle control tasks according to the movement data.

2. The motor vehicle system as claimed in claim 1, wherein the motor vehicle controller is configured to vary a strength of the power steering in dependence on the movement data received; and/or to deactivate a start-up function of the car.

3. The motor vehicle system as claimed in claim 1, wherein the movement sensor is integrated into a motor vehicle ignition key of the motor vehicle system.

4. The motor vehicle system as claimed in claim 3; further comprising a charging device, and wherein the motor vehicle ignition key comprises a rechargeable energy store, the charging device being adapted to charge the energy store of the motor vehicle ignition key.

5. The motor vehicle system as claimed in claim 3, further comprising an ignition key readout device, the ignition key readout device being configured to transmit the movement data from the motor vehicle ignition key to an external unit.

6. The motor vehicle system as claimed in claim 3, comprising a plurality of motor vehicle ignition keys, each motor vehicle ignition key having unambiguously associated therewith an index from the plurality of motor vehicle ignition keys; and
wherein the motor vehicle controller is adapted to perform motor vehicle control tasks while taking into account the movement data and the index.

7. A method comprising:
a) detecting a movement of a motor vehicle user using a movement sensor worn or carried by the motor vehicle user;
b) recording, by a memory, movement data based on the detected movement of the motor vehicle user;
c) outputting, by an intelligent system, the movement data from the memory;
d) performing, using a processor, motor vehicle control tasks according to the movement data; wherein the movement data output by the intelligent system is received by a motor vehicle controller.

8. The method as claimed in claim 7, wherein the movement sensor is integrated into a motor vehicle ignition key of the motor vehicle system.

9. A non-transitory computer readable medium including a computer program for performing, when the computer program is executed on a processor, a method comprising the steps of:
a) detecting a movement of a motor vehicle user using a movement sensor worn or carried by the motor vehicle user;
b) recording movement data based on the detected movement of the motor vehicle user;
c) outputting the movement data, and receiving the movement data by a motor vehicle controller;
d) performing motor vehicle control tasks according to the movement data.

10. The non-transitory computer readable medium as claimed in claim 9, wherein the movement sensor is integrated into a motor vehicle ignition key of the motor vehicle system.

* * * * *